UNITED STATES PATENT OFFICE.

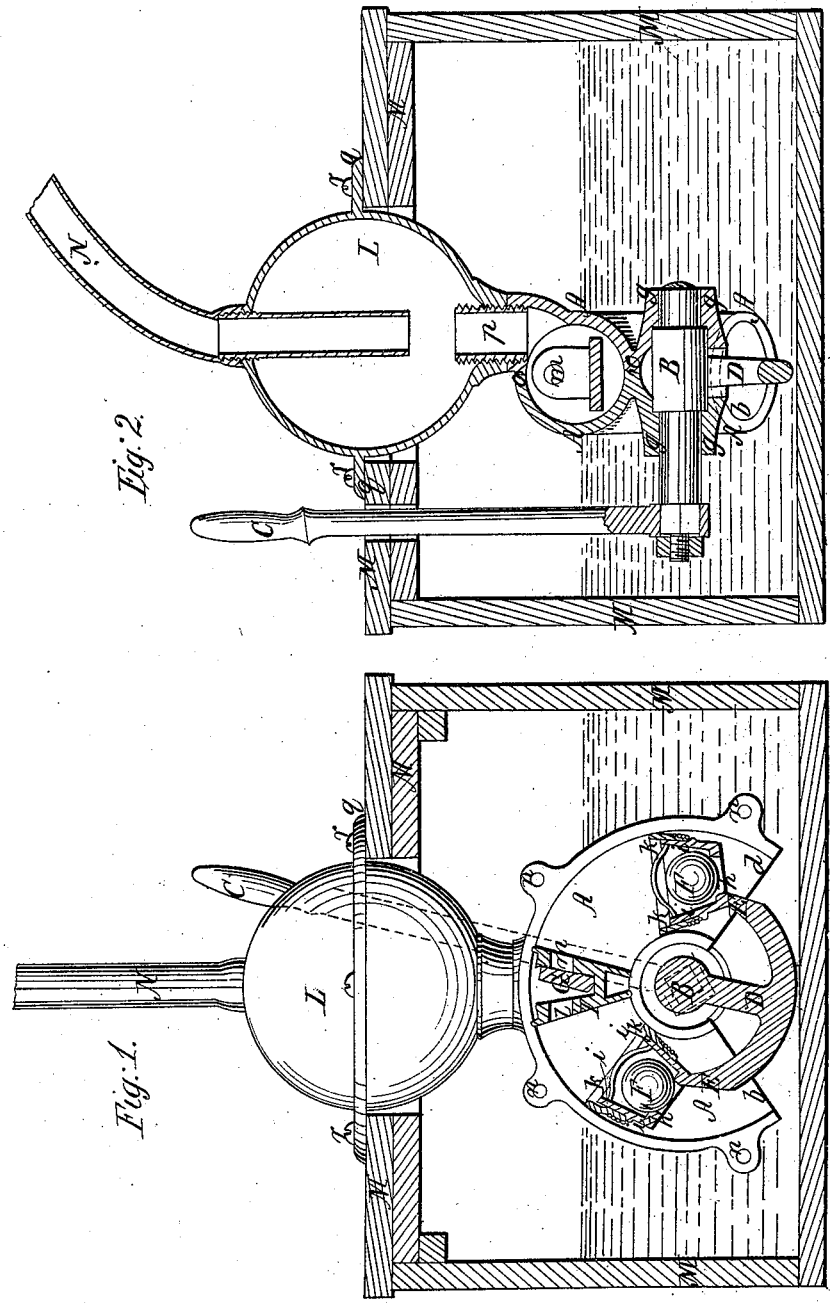

J. O. JOYCE, OF CINCINNATI, OHIO.

PUMP.

Specification forming part of Letters Patent No. 19,699, dated March 23, 1858; Reissued November 10, 1868, No. 3,190.

*To all whom it may concern:*

Be it known that I, JACOB O. JOYCE, of Cincinnati, in the county of Hamilton and State of Ohio, have invented certain new and useful Improvements in Pumps; and I hereby declare that the following is a full and exact description of the construction and operation of the same, reference being had to the accompanying drawings, and to the letters of reference marked thereon, making part of this specification, in which—

Figure 1, represents an elevation of the pump, one half of the pump chambers being detached therefrom, and representing the working parts in section. Fig. 2, represents a vertical cross section through said pump.

My invention relates to that class of pumps which are constructed with an annular pump chamber, and in which two pistons are vibrated in a circular direction in a manner that will be fully set forth in the following description.

To enable others skilled in the art to make and use my invention, I will proceed to describe the same with reference to the drawings.

A, represents the pump chamber which is made of an annular shape, as represented in Fig. 1, and which thus forms a tube where cross section is circular; the pump chamber A, is open at both its ends $b$ and $d$ for the admission of water.

B, is a shaft which has its bearings in the hub $g$ of the pump chamber, and which shaft can be turned on its axis by applying power to hand lever C. The shaft B, is formed with an arm D, the curved ends E, of which serve to support the pistons $h$ and $h'$. These pistons are composed of the hollow metal conical pieces $i$, provided with leather packings $k$, and balls F, which valves operate in a similar manner as the usual ball valves do.

G, represents a wedge valve placed within a casing I, which latter is provided with two passages $l$ and $m$ for the admission of water, and for which valve a patent was granted to John L. McPherson, and Jacob O. Joyce on the 12th of February, 1856, and which therefore needs no further description. The two halves of the pump chamber A, are bolted together by means of screw bolts passing through the holes $n$, of the flanches of said parts, and the joints are made water tight by the application of india rubber or gutta percha, which is placed within corresponding grooves in said flanches as represented in a cross section at $o$, Fig. 2. The pump chamber A, is secured to the air vessel L, by means of a screw joint $p$, the air vessel itself resting by means of a flange $q$, on the top of a box, tub, or cistern M, from which the water is to be pumped, it being attached to said top by means of screws or bolts $r$.

The operation of this machine is as follows: By operating hand lever C, and imparting to it a vibrating motion said motion is communicated to the valves $h$, and $h'$ by means of shaft B, and arms D, E. As the valve $h'$ rises, it is closed by the action of the water on ball F, and the valve G, is forced to the position represented in the drawings, the water passing through passage $l$, up into the air vessel, and out through hose N. When valve $h'$, rises, valve $h$, descends; the ball F is lifted by the water in the tank M, which fills that side of the pump chamber in which the valve $h$, works and at the next upward stroke of said valve the water is forced out through the discharge pipe. It will be seen by this operation that this pump is a force pump, which is principally adaptable, where a jet of water of considerable force is required, as for extinguishing fires or for watering gardens or other similar purposes in which case the pump can be attached to a movable water tight box or tank.

Having thus fully described the nature of my invention, what I claim therein as new, and desire to secure by Letters Patent is:—

The arrangement of the circular chambers having their valves operated as described, with the wedge valve G and its inlet and exit openings the whole being arranged in the manner and for the purpose herein set forth and explained.

J. O. JOYCE.

Witnesses:
C. W. SMITH,
C. C. CHAMPLING.

[FIRST PRINTED 1912.]